United States Patent
Kasahara

(10) Patent No.: US 11,066,066 B2
(45) Date of Patent: Jul. 20, 2021

(54) HYBRID VEHICLE DRIVE APPARATUS

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 16/800,640

(22) Filed: Feb. 25, 2020

(65) Prior Publication Data

US 2020/0282973 A1    Sep. 10, 2020

(30) Foreign Application Priority Data

Mar. 5, 2019 (JP) .............................. JP2019-039164

(51) Int. Cl.
| | |
|---|---|
| *B60W 20/40* | (2016.01) |
| *F16H 61/02* | (2006.01) |
| *F16H 59/54* | (2006.01) |
| *F16H 61/12* | (2010.01) |

(52) U.S. Cl.
CPC ............ *B60W 20/40* (2013.01); *F16H 59/54* (2013.01); *F16H 61/0206* (2013.01); *F16H 61/12* (2013.01); *F16H 2061/0209* (2013.01); *F16H 2061/1252* (2013.01); *F16H 2061/1264* (2013.01)

(58) Field of Classification Search
CPC ........ Y10T 477/26; B60K 6/365; B60K 3/36; B60K 3/38; B60Y 2200/92; B60W 20/40; F16H 61/0206; F16H 59/54; F16H 2061/1252; F16H 2061/0209; F16H 63/3483; F16H 63/3416; F16H 2061/1264; F16H 61/12

USPC .................................................. 475/5; 701/62
See application file for complete search history.

(56) References Cited

U.S. PATENT DOCUMENTS

| | | | |
|---|---|---|---|
| 10,562,522 B2* | 2/2020 | Omuro .................. | B60W 10/02 |
| 2007/0117671 A1* | 5/2007 | Long .................... | F16H 61/0206 475/116 |
| 2011/0023981 A1* | 2/2011 | Ito ........................... | F16H 61/12 137/488 |
| 2017/0268661 A1* | 9/2017 | Noda .................... | B60W 10/115 |
| 2019/0085974 A1* | 3/2019 | Kidachi .............. | F16H 61/0204 |

FOREIGN PATENT DOCUMENTS

JP     6015410 B2    10/2016

\* cited by examiner

*Primary Examiner* — Roger L Pang
(74) *Attorney, Agent, or Firm* — Duft & Bornsen, PC

(57) ABSTRACT

A drive apparatus of a hybrid vehicle including an internal combustion engine, a first motor-generator, a power division mechanism, a second motor-generator and a mode switching unit. The mode switching unit includes a hydraulic pressure source, a planetary gear mechanism, a clutch actuator, a brake actuator, a parking lock actuator, control valves, a failure detecting part and an electronic control unit, A microprocessor of the electronic control unit is configured to perform controlling the control valves so that hydraulic oil is supplied to the clutch actuator, the brake actuator and the parking lock actuator, respectively, when a parking brake is operated in a state that the failure of the third control valve is detected by the failure detecting part.

7 Claims, 13 Drawing Sheets

|  | BR | CL | OWY | ENG |
|---|---|---|---|---|
| EV MODE | × | × | × | × |
| W MOTOR MODE | × | ○ | ○ | × |
| SERIES MODE | ○ | ○ | × | ○ |
| HV MODE LOW | × | ○ | ○ | ○ |
| HV MODE HIGH | ○ | × | ○ | ○ |

EV MODE

W MOTOR MODE

SERIES MODE

HV LOW MODE

HV HIGH MODE

EV MODE

START MODE

HV LOW MODE

|  | | BR | CL | 81 | 82 | 85 | 83 |
|---|---|---|---|---|---|---|---|
| START MODE | | ○ | ○ | ON | ON | | |
| | | | | FAILURE | | ON | |
| PARKING LOCK | | ○ | ○ | | | | ON |
| | | | | | | ON | FAILURE |
| PARKING UNLOCK | | × | ○ | ON | | | |
| | | | | FAILURE | ON | | |

HYBRID VEHICLE DRIVE APPARATUS

CROSS-REFERENCE TO RELATED APPLICATION

This application is based upon and claims the benefit of priority from Japanese Patent Application No. 2019-039164 filed on Mar. 5, 2019, the content of which is incorporated herein by reference.

BACKGROUND OF THE INVENTION

Field of the Invention

This invention relates to a drive apparatus of a hybrid vehicle.

Description of the Related Art

Conventionally, there is a known apparatus that includes an engine and a first and second motor-generators so that torque output from the engine is divided and transmitted to the first motor-generator and an output shaft through a planetary gear mechanism and a hybrid vehicle is made to travel by torque of the output shaft and torque of the second motor-generator. Such an apparatus is described, for example, in Japanese Patent Publication No. 6015410 (JP6015410B). The apparatus described in JP6015410B includes a clutch and brake connected to the planetary gear mechanism, switches a speed stage in accordance with engagement action of the clutch and brake, and starts the engine.

In general, in the apparatus including multiple hydraulic actuators including a pair of engagement mechanism (e.g., clutch and brake) operated by hydraulic pressure, it is necessary to provide not only multiple control valves for controlling flow of hydraulic oil to the hydraulic actuators, but also spare control valves in preparation for failure of the multiple control valves. Therefore, the apparatus brings an increase in number of control valves and an increase in cost.

SUMMARY OF THE INVENTION

An aspect of the present invention is a drive apparatus of a hybrid vehicle including: an internal combustion engine; a first power transmission path and a second power transmission path connected with each other in series; a first motor-generator connected to an output shaft of the internal combustion engine; a power division mechanism configured to divide and output a power generated by the internal combustion engine to the first motor-generator and the first power transmission path; a second motor-generator connected to the second power transmission path; and a mode switching unit configured to switch a drive mode to one of a plurality of drive modes including an EV mode in which the hybrid vehicle is driven by a power of the second motor-generator with the internal combustion engine stopped, a start mode in which the internal combustion engine is started, and a HV mode in which the hybrid vehicle is driven by the power of the internal combustion engine and the power of the second motor-generator. The mode switching unit includes: a planetary gear mechanism disposed in the first power transmission path and including a sun gear, ring gear and a carrier; a hydraulic pressure source; a plurality of hydraulic actuators including a first hydraulic actuator, a second hydraulic actuator and a third hydraulic actuator, respectively operated by a hydraulic pressure of a hydraulic oil supplied from the hydraulic pressure source; a plurality of control valves configured to control flows of the hydraulic oil from the hydraulic pressure source to the plurality of hydraulic actuators; a failure detecting part configured to detect a failure of the plurality of control valves; and an electronic control unit including a microprocessor configured to perform controlling the plurality of control valves in accordance with a switching instruction of the drive mode. Each of the sun gear, the ring gear and the carrier is any one of a first rotation member to which a power divided by the power division mechanism is input, a second rotation member connected to the second power transmission path, and a third rotation member. The first hydraulic actuator is a clutch actuator configured to couple or uncouple the second rotation member and the third rotation member. The second hydraulic actuator is a brake actuator configured to brake or non-brake the third rotation member. The third hydraulic actuator is a parking lock actuator configured to operate a parking brake of the hybrid vehicle. The plurality of control valves includes: a first control valve disposed in a first oil passage connecting the hydraulic pressure source and the first hydraulic actuator; a second control valve disposed in a second oil passage connecting the hydraulic pressure source and the second hydraulic actuator; a third control valve disposed in a third oil passage connecting the hydraulic pressure source and the third hydraulic actuator; and a fourth control valve disposed in a fourth oil passage connecting the hydraulic pressure source and each of the first hydraulic actuator, the second hydraulic actuator and the third hydraulic actuator. The microprocessor is configured to perform the controlling including controlling the fourth control valve so that the hydraulic oil is supplied to the first hydraulic actuator, the second hydraulic actuator and the third hydraulic actuator, respectively, when the parking brake is operated in a state that the failure of the third control valve is detected by the failure detecting part.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
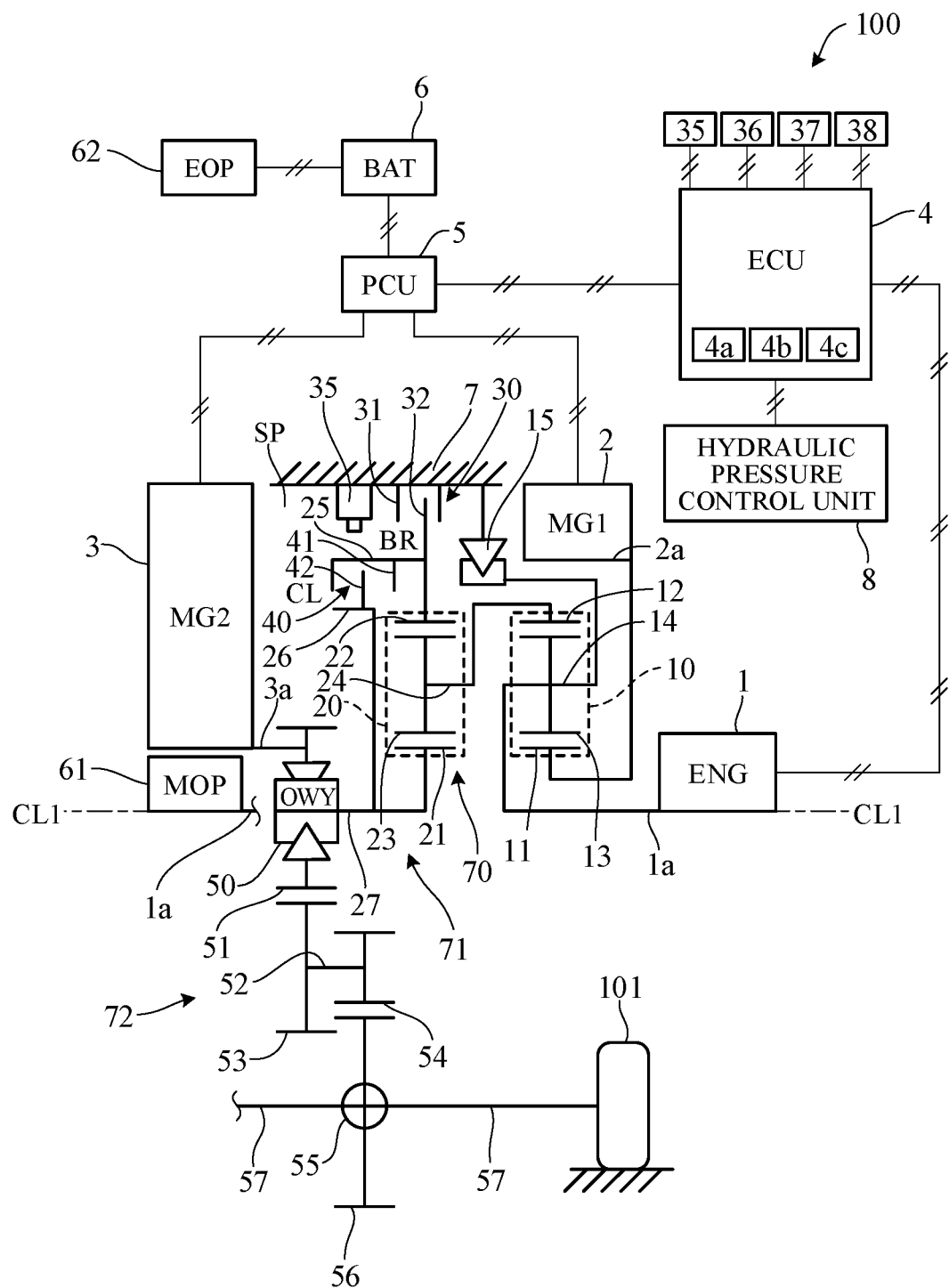
FIG. 1 is a diagram showing schematically a configuration overview of a drive apparatus of a hybrid vehicle according to an embodiment of the invention.

Hereinafter, an embodiment of the present invention is explained with reference to FIGS. 1 to 13F. A drive apparatus according to an embodiment of the present invention is applied to a hybrid vehicle including an engine and a motor-generator as a drive power source. FIG. 1 is a diagram showing schematically a configuration overview of a drive apparatus 100 according to the present embodiment.

As shown in FIG. 1, the drive apparatus (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive apparatus 100 is mounted at front of a vehicle, and motive power of the drive apparatus 100 is transmitted to front wheels 101.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis CL1, and rotates around the axis CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven to rotate around the axis CL1 by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor.

The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first pinions 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second pinions 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In other words, the brake mechanism 30 configures a hydraulic actuator operated by hydraulic pressure.

In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to an output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8. In other words, the clutch mechanism 40 configures a hydraulic actuator operated by hydraulic pressure.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage being shifted to low.

The second planetary gear mechanism 20, brake mechanism 30 and clutch mechanism 40 configure a speed change mechanism 70 that shifts rotation of the second carrier 24 between two speed stages (high and low) and outputs the shifted rotation from the output shaft 27. Torque transmission path from the first planetary gear mechanism 10 to the output shaft 27 of upstream of the one-way clutch 50 through the speed change mechanism 70 configures a first power transmission path 71.

The output shaft 27 is connected through a one-way clutch (OWY) 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the output shaft 27 and the rotating shaft 3a, forward relative rotation of the rotating shaft 3a with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3a. Since axial length of the drive apparatus 100 can therefore be minimized, a smaller drive apparatus 100 can be realized.

An oil pump (MOP) 61 is installed radially inward of the rotor of the second motor-generator 3. The oil pump 61 is connected to the output shaft 1a of the engine 1 and driven by the engine 1. Oil supply necessary when the engine 1 is stopped is covered by driving an electric pump (EOP) 62 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3a, output gear 51, large-diameter gear 53, small-diameter gear 54 and differential unit 55, inter alia, configure a second power transmission path 72 from the rotating shaft 3a to the axles 57. The first and second power transmission paths 71 and 72 are connected with each other in series.

Figure 9:
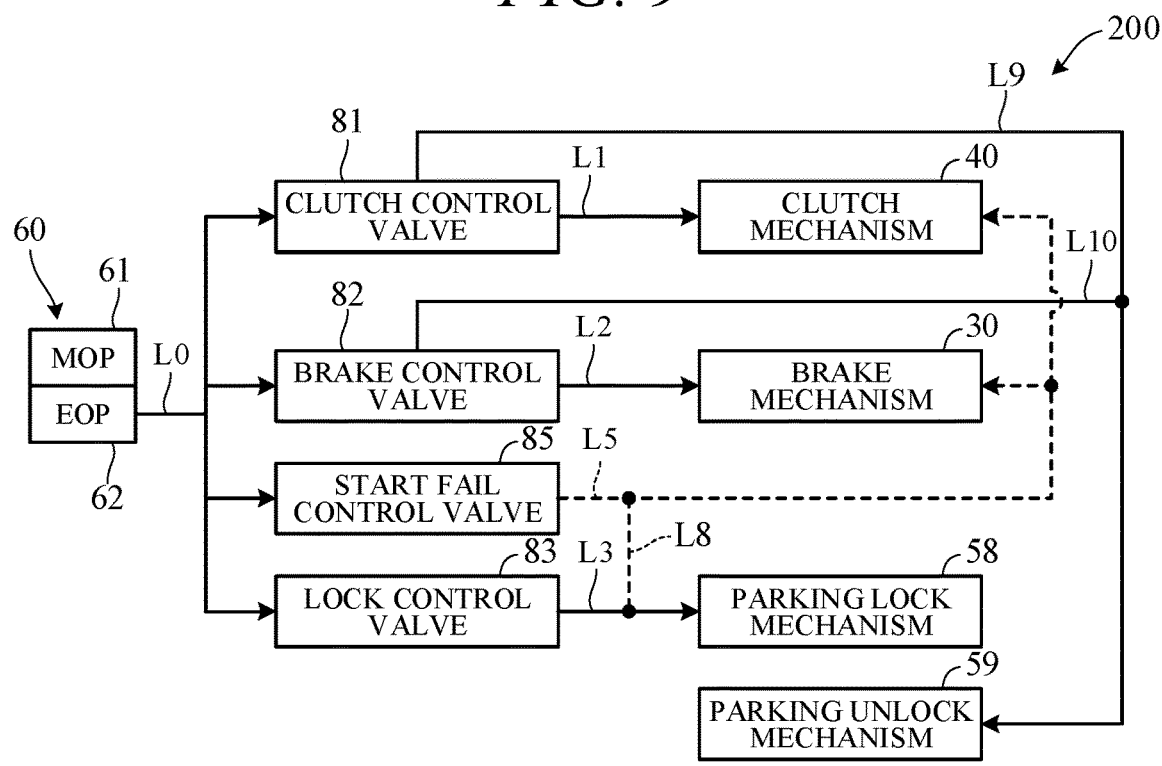
FIG. 9 is a diagram showing schematically a configuration of a hydraulic circuit of a hydraulic pressure control apparatus of FIG. 1.

The hydraulic pressure control unit 8 includes electromagnetic valve, proportional electromagnetic valve, and other control valves actuated in accordance with electric signals. These control valves operate to control hydraulic pressure flow to the brake mechanism 30, clutch mechanism 40 and the like in accordance with instructions from the controller 4. This enables ON-OFF switching of the brake mechanism 30 and clutch mechanism 40. The drive apparatus 100 according to the present embodiment includes a parking lock mechanism and a parking unlock mechanism for locking or unlocking rotation of the wheels 101, i.e., operating a parking brake and cancelling an operation of the parking brake by hydraulic pressure as a hydraulic actuator, other than the brake mechanism 30 and the clutch mechanism 40 (FIG. 9). These parking lock mechanism and parking unlock mechanism include respectively state maintaining mechanisms for maintaining locked state and unlocked state without using hydraulic pressure, after being switched to the locked state and unlocked state by hydraulic pressure.

The controller (ECU) 4 as an electronic control unit incorporates an arithmetic processing unit having a CPU, ROM, RAM and other peripheral circuits, and the CPU includes an engine control ECU 4a, a hydraulic actuator control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, the rotational speed sensor 35 for detecting rotational speed of the drum 25, a vehicle speed sensor 36 for detecting vehicle speed, an accelerator opening angle sensor 37 for detecting accelerator opening angle indicative of amount of accelerator pedal depression, and hydraulic pressure sensor 38 for detecting hydraulic pressure applied to each hydraulic pressure (brake mechanism 30, clutch mechanism 40, etc.). Although not indicated in the drawings, the controller 4 also receives signals from a sensor for detecting rotational speed of the engine 1, a sensor for detecting rotational speed of the first motor-generator 2 and a sensor for detecting rotational speed of the second motor-generator 3.

Based on these input signals, the controller 4 decides drive mode in accordance with a predefined driving force map representing vehicle driving force characteristics defined in terms of factors such as vehicle speed and accelerator opening angle. In order to enable the vehicle to travel in the decided drive mode, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8 (control valve).

Figures 2, 3:
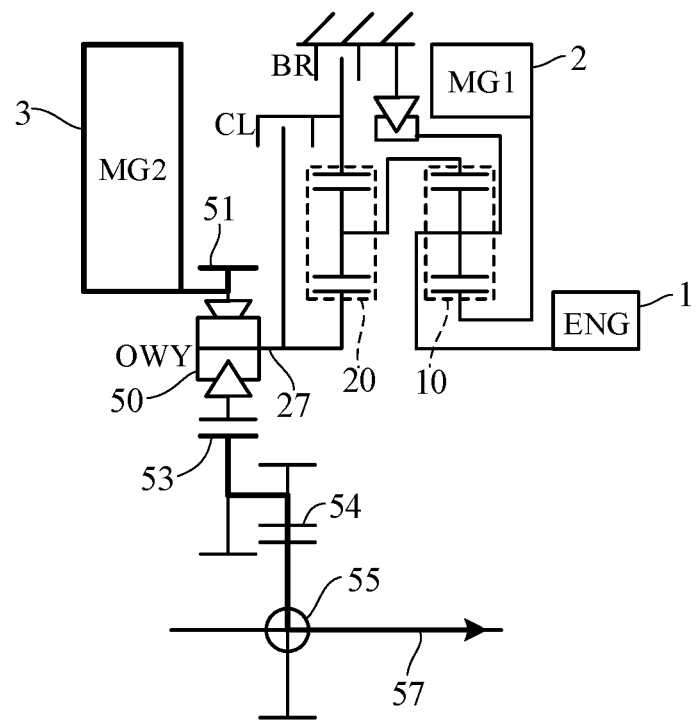
FIG. 2 is a diagram an example of drive modes implemented by the drive apparatus of the hybrid vehicle according to the embodiment of the invention.
FIG. 3 is a skeleton diagram showing a flow of torque transmission in EV mode in the drive apparatus of FIG. 1.

FIG. 2 is a table showing examples of some drive modes that can be implemented by the drive apparatus 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 2, EV mode, W motor mode, series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol "○", while brake mechanism 30 OFF (Disengaged), clutch mechanism 40 OFF (Disengaged), one-way clutch 50 Unlocked, and engine 1 Stopped are indicated by symbol "x".

In EV mode, the vehicle is driven for traveling solely by motive power of the second motor-generator 3. As shown in FIG. 2, in EV mode, the brake mechanism 30 and clutch mechanism 40 are both OFF, and the engine 1 is stopped, in accordance with instructions from the controller 4. FIG. 3 is a skeleton diagram showing flow of torque transmission in EV mode.

As show in FIG. 3, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side) in the torque transmission path from the engine 1 to the wheel 101.

Figure 4:
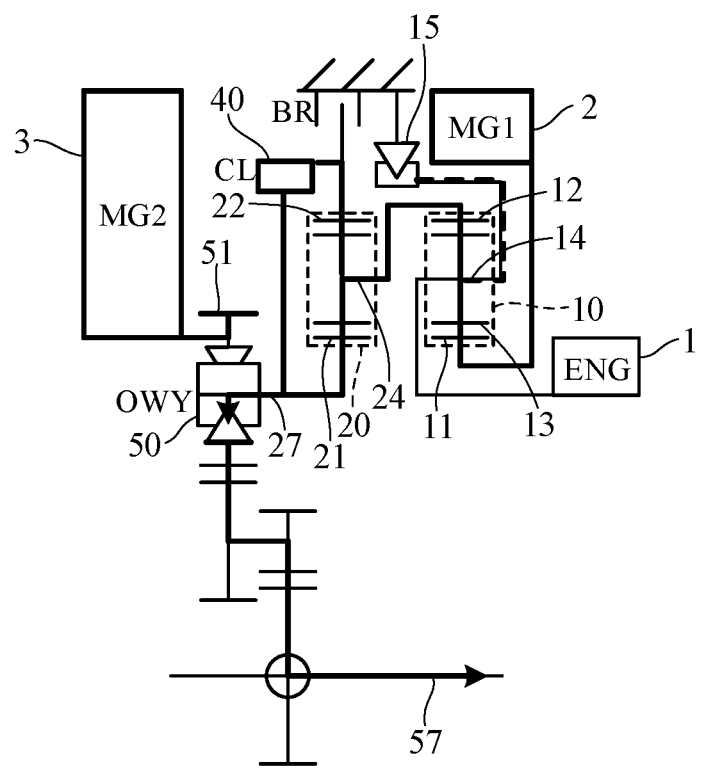
FIG. 4 is a skeleton diagram showing a flow of torque transmission in W motor mode in the drive apparatus of FIG. 1.

In W motor mode, the vehicle is driven for traveling by motive power of the first motor-generator 2 and the second motor-generator 3. As shown in FIG. 2, in W motor mode, the brake mechanism 30 is OFF, the clutch mechanism 40 is ON and the engine 1 is stopped, in accordance with instructions from the controller 4. FIG. 4 is a skeleton diagram showing flow of torque transmission in W motor mode.

As show in FIG. 4, in W motor mode, rotation of the first carrier 14 is prevented by action of the one-way clutch 15, and torque output from the first motor-generator 2 is transmitted through the first sun gear 11, first pinions 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode, travel driving force can be increased to greater than in EV mode.

Figure 5:
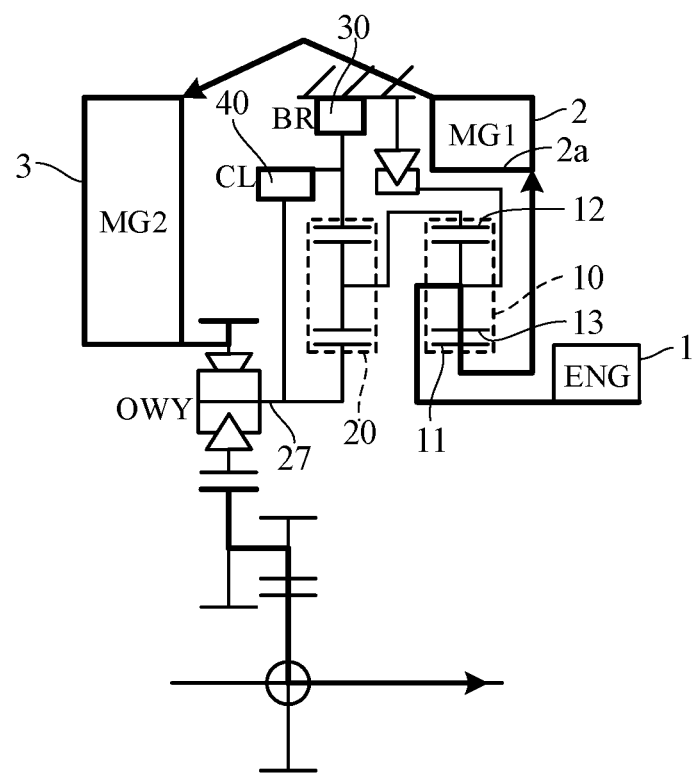
FIG. 5 is a skeleton diagram showing a flow of torque transmission in series mode in the drive apparatus of FIG. 1.

In series mode, the vehicle is driven for traveling by motive power of the second motor-generator 3 while the first motor-generator 2 is being driven by motive power from the engine 1 to generate electric power. As shown in FIG. 2, in series mode, the brake mechanism 30 and clutch mechanism 40 are both ON and the engine 1 is operated, in accordance with instructions from the controller 4. FIG. 5 is a skeleton diagram showing flow of torque transmission in series mode.

As shown in FIG. 5, in series mode, rotation from the first ring gear 12 to as far as the output shaft 27 is stopped, so that all power output from the engine 1 is input through the first pinions 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50. Amount of power supplied to the second motor-generator 3 through the electrical path is not greater than allowable output of the power control unit 5.

In HV mode, the vehicle is driven for traveling by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 2, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 6:
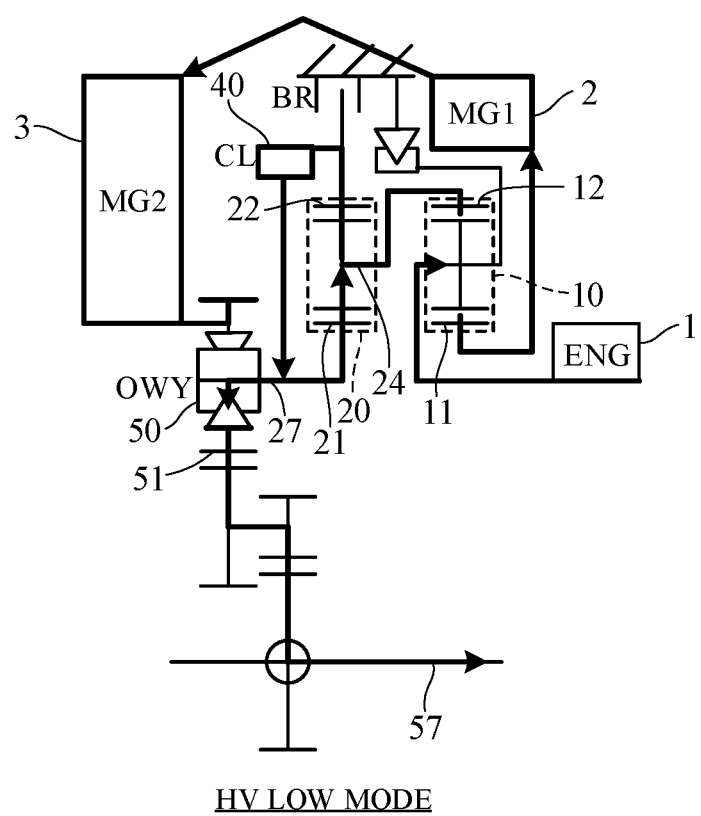
FIG. 6 is a skeleton diagram showing a flow of torque transmission in HV low mode in the drive apparatus of FIG. 1.

FIG. 6 is a skeleton diagram showing flow of torque transmission in HV low mode. As shown in FIG. 6, in HV low mode, some torque output from the engine 1 is transmitted through the first sun gear 11 to the first motor-generator 2. As a result, the battery 6 is charged by power generated by the first motor-generator 2, and, in addition, electrical drive power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 7:
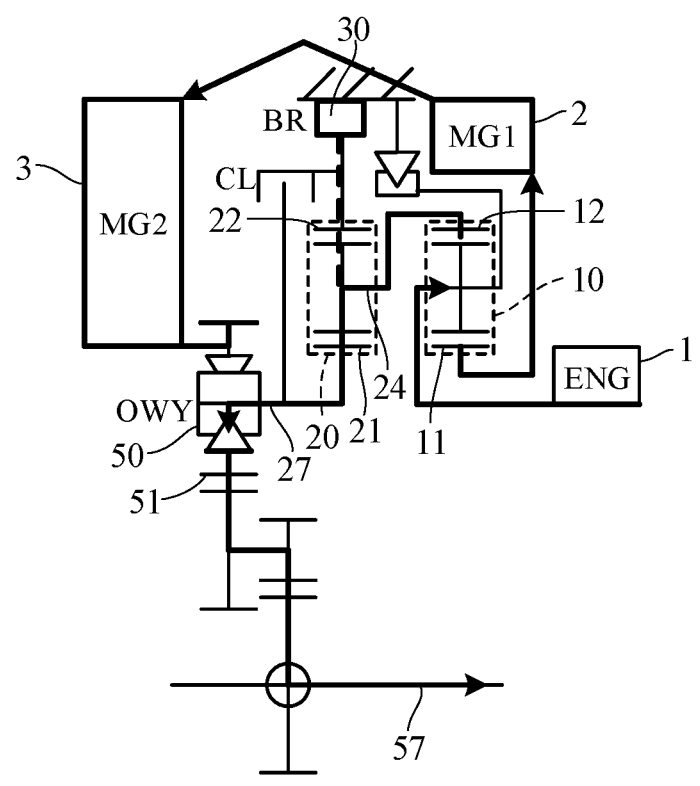
FIG. 7 is a skeleton diagram showing a flow of torque transmission in HV high mode in the drive apparatus of FIG. 1.

FIG. 7 is a skeleton diagram showing flow of torque transmission in HV high mode. As shown in FIG. 7, in HV high mode, similarly to in HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized.

Figure 8A:
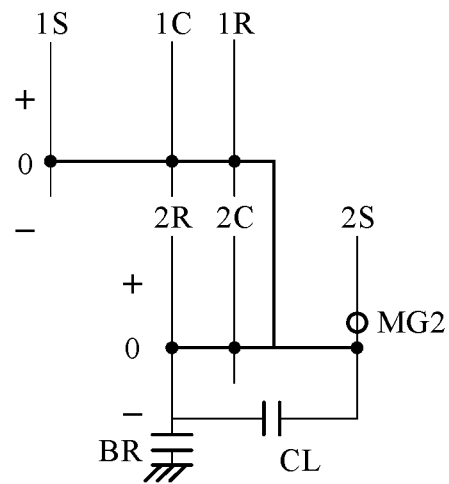
FIG. 8A is an alignment chart showing an example of operation in EV mode.
Figure 8B:
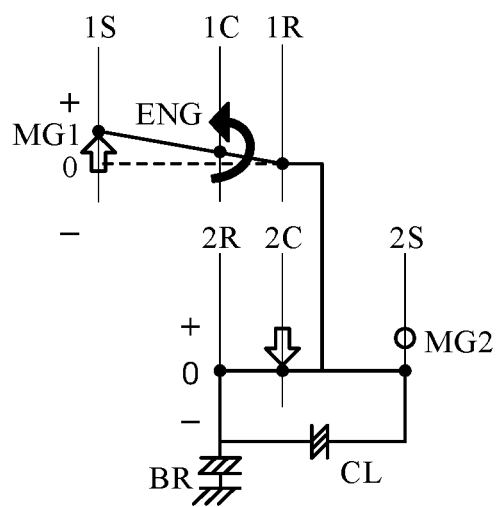
FIG. 8B is an alignment chart showing an example of operation in start mode.

The drive modes further includes a start mode for starting the engine 1 in addition to the drive modes shown in FIG. 2. FIGS. 8A to 8B are diagrams each showing an example of an alignment chart corresponding to an operation during a process from EV mode to HV low mode through start mode. In the drawings, the first sun gear 11, first carrier 14 and first ring gear 12 are designated 1S, 1C and 1R, respectively, and the second sun gear 21, second carrier 24 and second ring gear 22 are designated 2S, 2C and 2R, respectively. Rotation direction of the first ring gear 12 and second carrier 24 during forward vehicle movement is defined as positive direction. Forward direction is indicated by symbol "+" and torque acting in forward direction is indicated by upward pointing arrow.

In EV mode, for example, the vehicle starts traveling in response to driver depression of the accelerator pedal. As shown in FIG. 8A, in EV mode, action of the one-way clutch 50 keeps rotation of the second sun gear 21 (2S) of the second planetary gear mechanism 20 stopped, and only the second motor-generator 3 (MG2) is driven to rotate in positive direction so that the vehicle traveling is started by driving torque from the second motor-generator 3.

After the vehicle starts off in EV mode, drive mode switches to HV mode (e.g., HV low mode) along with increase of vehicle speed. This leads first to the engine 1 being started in start mode. In start mode, as shown in FIG. 8B, while the second motor-generator 3 (MG2) is being kept rotationally driven in positive direction, the brake mechanism 30 (BR) and clutch mechanism 40 (CL) are both turned ON, and rotation of the second carrier 24 (2C) and first ring gear 12 (1R) is stopped. In this state, the first motor-generator 2 (MG1) is rotationally driven in positive direction to rotate the output shaft 1a of the engine 1 through the first carrier 14 (1C) and thereby start the engine 1. Optionally, the order of the procedures of turning ON the brake mechanism 30 (BR) and clutch mechanism 40 (CL) and of rotationally driving the first motor-generator 2 (MG1) in positive direction can be reversed.

Figure 8C:
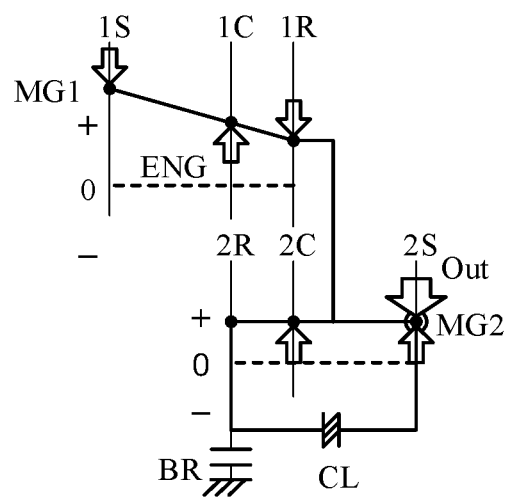
FIG. 8C is an alignment chart showing an example of operation in HV low mode.

After the engine starts, drive mode is switched to HV low mode. In this case, as shown in FIG. 8C, the brake mechanism 30 (BR) is turned OFF and clutch mechanism 40 (CL) is turned ON. Since this causes reaction force to act on the first ring gear 12 (1R), the first ring gear 12 (1R) is rotated in positive direction by the engine 1 and the first motor-generator 2 (MG1) starts to generate electricity. After engine starting, rotational speed of the second sun gear 21 (2S) gradually increases.

Once increase of engine speed causes rotational speed of the second sun gear 21 (2S) to reach rotational speed of the second motor-generator 3 (MG2), torque of the second sun gear 21 (2S) is added to torque of the second motor-generator 3, thereby enabling the vehicle to travel with greater driving force than when traveling in EV mode.

Figure 10:
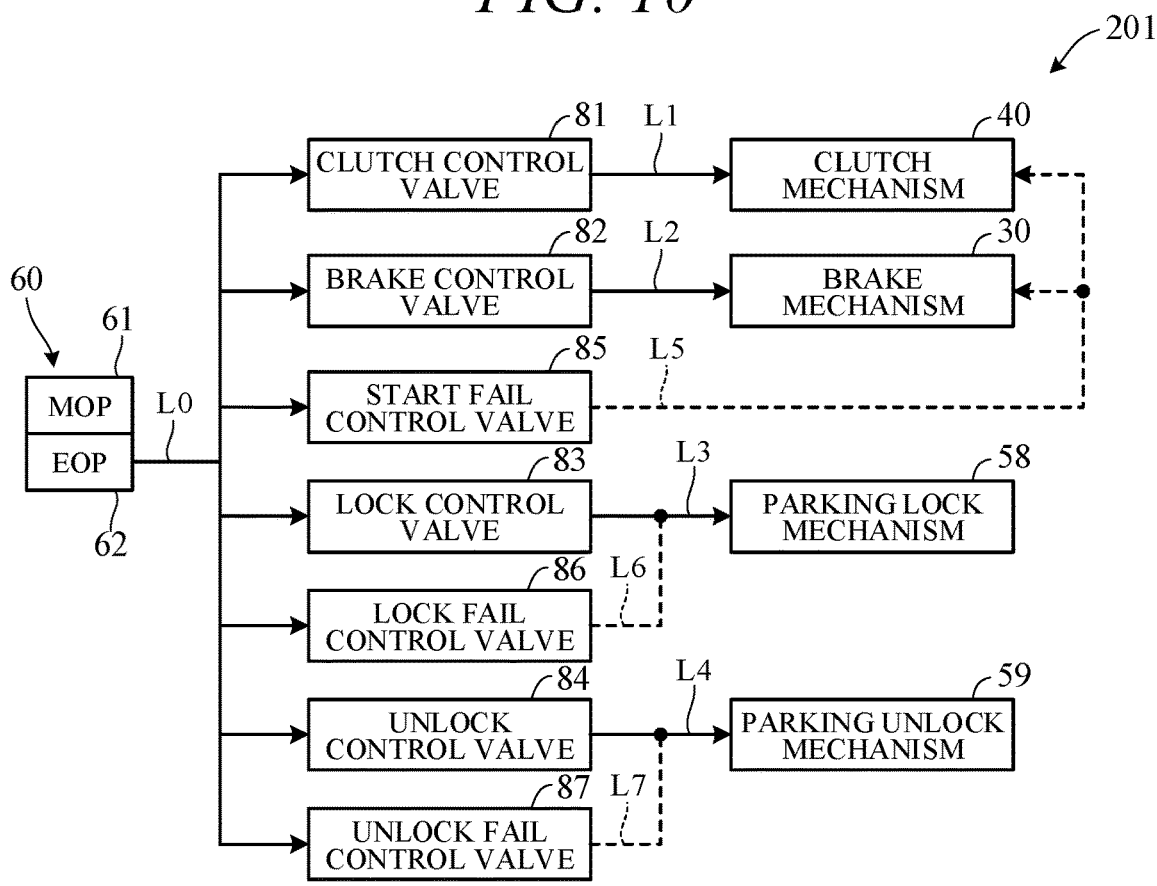
FIG. 10 is a diagram showing a reference example of FIG. 9.

The drive apparatus 100 configured as described in the foregoing is characterized chiefly by the configuration of the hydraulic pressure control unit 8 (FIG. 1). FIG. 9 is an overview of the structure of the hydraulic circuit 200 of the hydraulic pressure control unit 8, particularly circuit configuration from the hydraulic pressure source to the multiple hydraulic actuators, and FIG. 10 is a diagram showing a reference example for comparison therewith. Specifically, FIG. 9 and FIG. 10 respectively show hydraulic circuits 200 and 201 running from the hydraulic pressure source 60 configured by the oil pump 61 and the electric pump 62 to the clutch mechanism 40, brake mechanism 30, parking lock mechanism 58, and parking unlock mechanism 59. First follows an explanation of the reference example of FIG. 10.

The hydraulic circuit 201 shown in FIG. 10 includes multiple control valves 81 to 84 associated respectively with the clutch mechanism 40, brake mechanism 30, parking lock mechanism 58, and parking unlock mechanism 59. Specifically, the clutch control valve 81 for controlling flow of hydraulic oil from the hydraulic pressure source 60 to the clutch mechanism 40 is installed in oil passage L1 connecting the hydraulic pressure source 60 and the clutch mechanism 40. The brake control valve 82 for controlling flow of hydraulic oil from the hydraulic pressure source 60 to the brake mechanism 30 is installed in oil passage L2 connecting the hydraulic pressure source 60 and the brake mechanism 30. The lock control valve 83 for controlling flow of hydraulic oil from the hydraulic pressure source 60 to the parking lock mechanism 58 is installed in oil passage L3 connecting the hydraulic pressure source 60 and the parking lock mechanism 58. The unlock control valve 84 for controlling flow of hydraulic oil from the hydraulic pressure source 60 to the parking unlock mechanism 59 is installed in oil passage L4 connecting the hydraulic pressure source 60 and the parking unlock mechanism 59.

The control valves 81 to 84 are electromagnetic control valves having solenoids and are operated by electric signals output to the solenoids from the controller 4. The control valves 81 to 84 are, for example, adapted to open in response to ON signals and close in response to OFF signals. The so-configured control valves 81 to 84 are susceptible to electrical disconnection, sticking and similar failures. Failure of any control valve 81 to 84 is apt to make desired supply of hydraulic oil to the associated actuator (clutch mechanism 40, brake mechanism 30, etc.) impossible. So, in preparation for failure of any control valve 81 to 84, the hydraulic circuit 201 of FIG. 10 is provided with multiple spare control valves 85 to 87 installed in parallel with the control valves 81 to 84, and, as indicated by dotted lines, the control valves 85 to 87 and the clutch mechanism 40, brake mechanism 30, parking lock mechanism 58 and parking unlock mechanism 59 are connected by oil passages L5 to L7.

Specifically, the control valve 85, which is a start fail control valve for controlling flow of hydraulic oil from the hydraulic pressure source 60 to the clutch mechanism 40 and brake mechanism 30, is installed in oil passage L5 bypassing the clutch control valve 81 and brake control valve 82 and connecting the hydraulic pressure source 60 to the clutch mechanism 40 and brake mechanism 30. The control valve 86, which is a lock fail control valve for controlling flow of hydraulic oil from the hydraulic pressure source 60 to the parking lock mechanism 58, is installed in oil passage L6 bypassing the lock control valve 83 and connecting the hydraulic pressure source 60 and the parking lock mechanism 58. The control valve 87, which is a unlock fail control valve for controlling flow of hydraulic oil from the hydraulic pressure source 60 to the parking unlock mechanism 59, is installed in oil passage L7 bypassing the unlock control valve 84 and connecting the hydraulic pressure source 60 and the parking unlock mechanism 59. Like the control valves 81 to 84, the control valves 85 to 87 are electromagnetic control valves having solenoids and are, for example, adapted to open in response to ON signals and close in response to OFF signals from the controller 4.

The configuration shown in FIG. 10 requires the numerous control valves 81 to 87, and the resulting increase in number of components adds to overall apparatus cost. Therefore, the present embodiment is directed to configuring the hydraulic pressure control unit 8 (hydraulic circuit 200) so as to minimize the number of control valves.

As shown in FIG. 9, not only are the clutch mechanism 40 and brake mechanism 30 connected to oil passage L5 but the parking lock mechanism 58 is also connected thereto through oil passage 8. So when the start fail control valve 85 turns ON, hydraulic oil is supplied from the hydraulic pressure source 60 not only to the clutch mechanism 40 and brake mechanism 30 but also to the parking lock mechanism 58. Moreover, the clutch control valve 81 and the brake control valve 82 are connected to the parking unlock mechanism 59 through oil passage L9 and oil passage L10, respectively.

The clutch control valve 81 is configured so that when ON, oil passages L1 and L9 are communicated with oil passage L0 upstream of the clutch control valve 81, and when OFF, oil passages L1 and L9 are cut off from oil passage L0. The brake control valve 82 is configured so that when ON, oil passages L2 and L10 are communicated with oil passage L0 upstream of the brake control valve 82, and when OFF, oil passages L2 and L10 are cut off from oil passage L0. Therefore, when the clutch control valve 81 is ON, hydraulic oil is supplied from the hydraulic pressure source 60 not only to the clutch mechanism 40 but also to the parking unlock mechanism 59, and when the brake control valve 82 is ON, hydraulic oil is supplied from the hydraulic pressure source 60 not only to the brake mechanism 30 but also to the parking unlock mechanism 59.

Further, when the clutch control valve 81 is OFF, hydraulic oil from the brake control valve 82 is prevented from flowing backward to the clutch control valve 81 through oil passages L10 and L9 even if the brake control valve 82 is ON. Therefore, supply of hydraulic oil to the clutch mechanism 40 is prevented. When the brake control valve 82 is OFF, hydraulic oil from the clutch control valve 81 is prevented from flowing backward to the brake control valve 82 through oil passages L9 and L10 even if the clutch control valve 81 is ON. Therefore, supply of hydraulic oil to the brake mechanism 30 is prevented.

Figures 11, 12:
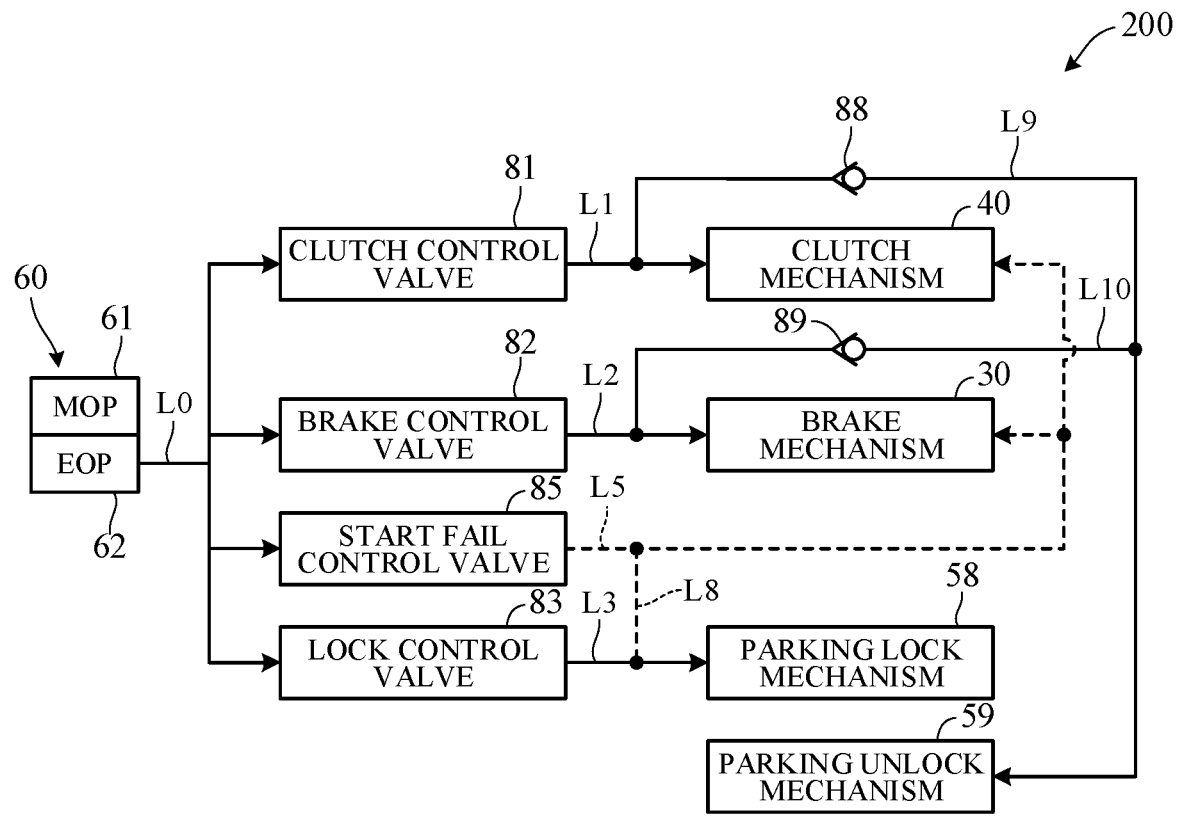
FIG. 11 is a diagram showing a modification of FIG. 9.
FIG. 12 is a diagram showing in tabular form an example of operation of control valves of FIG. 9.

FIG. 11 is a diagram showing a modification of the arrangement shown in FIG. 9. In the example of FIG. 11, oil passage L9 is connected to oil passage L1, and oil passage L10 is connected to oil passage L2. In addition, oil passages L9 and L10 are respectively provided with a check valve 88 and a check valve 89. Similarly to in the configuration of FIG. 9, therefore, hydraulic oil can be supplied to the clutch mechanism 40 and the parking unlock mechanism 59 when the clutch control valve 81 is ON, and supply of hydraulic oil to the clutch mechanism 40 can be prevented when the clutch control valve 81 is OFF. Moreover, hydraulic oil can be supplied to the brake mechanism 30 and the parking unlock mechanism 59 when the brake control valve 82 is ON, and supply of hydraulic oil to the brake mechanism 30 can be prevented when the brake control valve 82 is OFF.

The control valves 81 to 83 and 85 of FIGS. 9 and 11 are switched in accordance with drive mode in response to control signals from the controller 4. FIG. 12 is a tabular diagram showing an example of action of the control valves 81 to 83 and 85, and FIGS. 13A to 13F are diagrams showing flows of hydraulic oil corresponding to actions shown in FIG. 12. FIG. 12 shows actions corresponding to starting of the engine 1, operation of the parking lock mechanism 58, and operation of the parking unlock mechanism 59. In FIG.

12, similar to in FIG. 2, ON (engaged) state of the brake mechanism 30 and ON (engaged) state of the clutch mechanism 40 are designated by symbol "○" and OFF (disengaged) state of the brake mechanism 30 and OFF (disengaged) state of the clutch mechanism 40 are designated by symbol "×". Engine 1 start and parking lock are possible during vehicle traveling and when the vehicle stops, and parking unlock is possible when the vehicle stops. Parking lock during vehicle traveling includes parking lock by means of so-called ratcheting.

In start mode, as shown in FIG. 12, the controller 4 outputs control signals to the clutch control valve 81 and brake control valve 82 to turn the clutch control valve 81 and the brake control valve 82 ON. Therefore, as indicated by thick lines in FIG. 13A, hydraulic oil from the hydraulic pressure source 60 is supplied through the clutch control valve 81 and oil passage L1 to the clutch mechanism 40, and through the brake control valve 82 and oil passage L2 to the brake mechanism 30. As a result, the clutch mechanism 40 and the brake mechanism 30 engage to enable start of the engine 1.

At this time, hydraulic oil from the clutch control valve 81 and the brake control valve 82 is supplied through oil passages L9 and L10 to the parking unlock mechanism 59. This unlocks parking lock, i.e., cancels operation of the parking brake and makes it possible, while traveling in EV mode, for example, for the engine 1 to start and drive mode to switch to HV mode.

Hydraulic pressure sensor 38 (FIG. 1) is provided, for example, as a plurality of sensors installed individually on oil passages L1 to L3 and L5, and signals from these hydraulic pressure sensors 38 are used by the controller 4 to determine whether the control valves 81 to 83 and 85 are working normally. In start mode, as shown in FIG. 12, when the controller 4 determines based signals from the hydraulic pressure sensors 38 that one or the other of the clutch control valve 81 and brake control valve 82 (for example, the clutch control valve 81) fails, the controller 4 determines based on a signal from the vehicle speed sensor 36 (FIG. 1) whether the vehicle is stopped. Then, on condition of the vehicle being stopped, the controller 4 outputs a control signal to the start fail control valve 85 to turn the start fail control valve 85 ON. It simultaneously outputs a control signal also to the brake control valve 82 to turn the brake control valve 82 OFF.

Figure 13A:
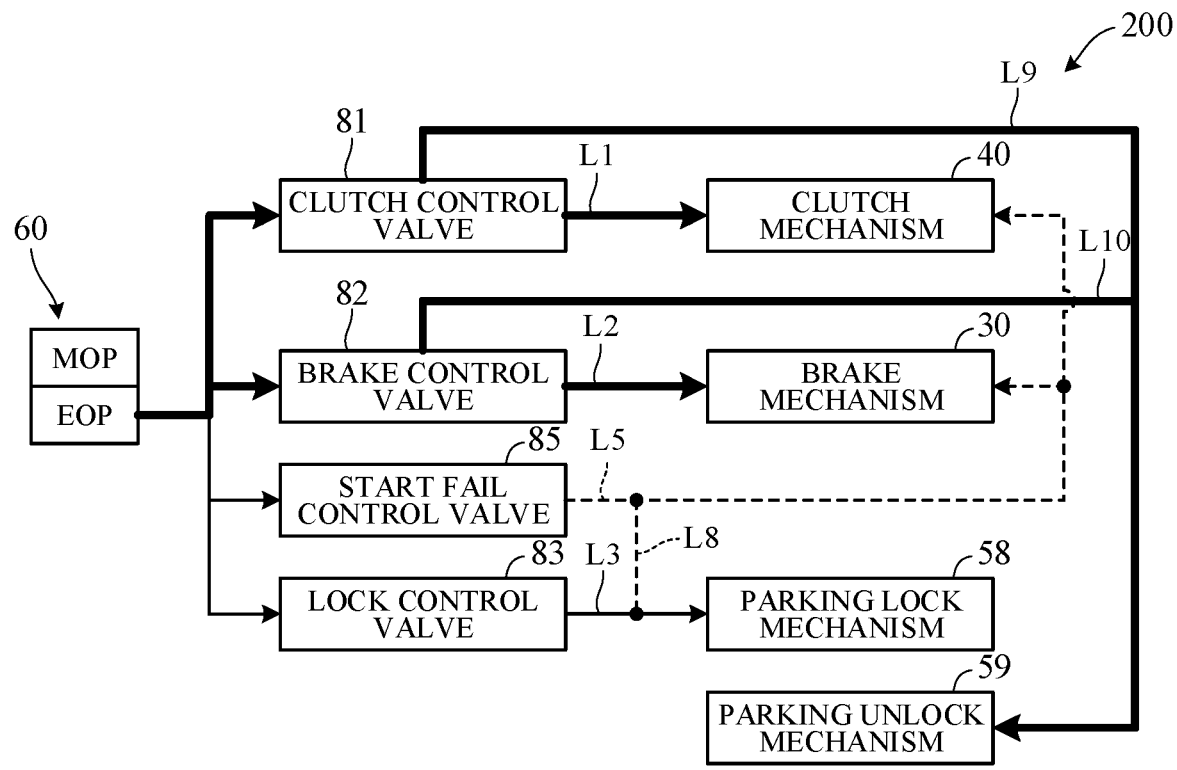
FIG. 13A is a diagram showing a flow of hydraulic oil in normal state of control valves in start mode.
Figure 13B:
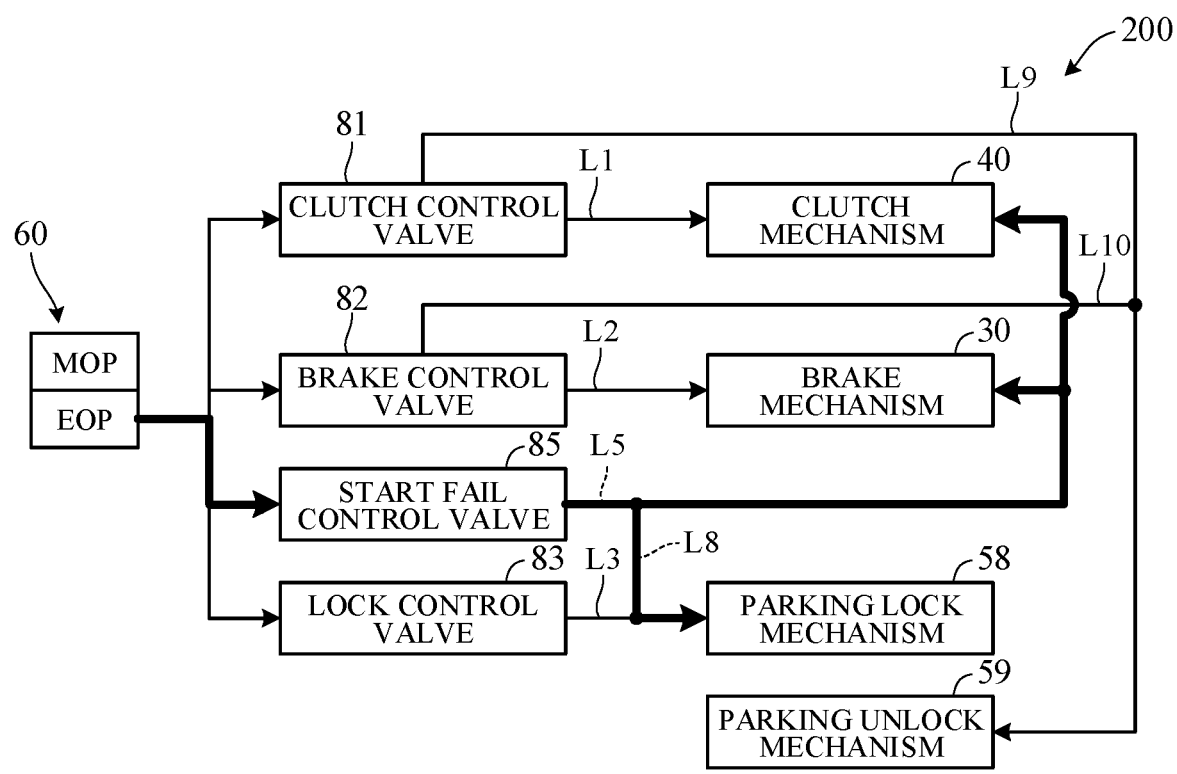
FIG. 13B is a diagram showing a flow of hydraulic oil in failed state of control valves in start mode.
Figure 13C:
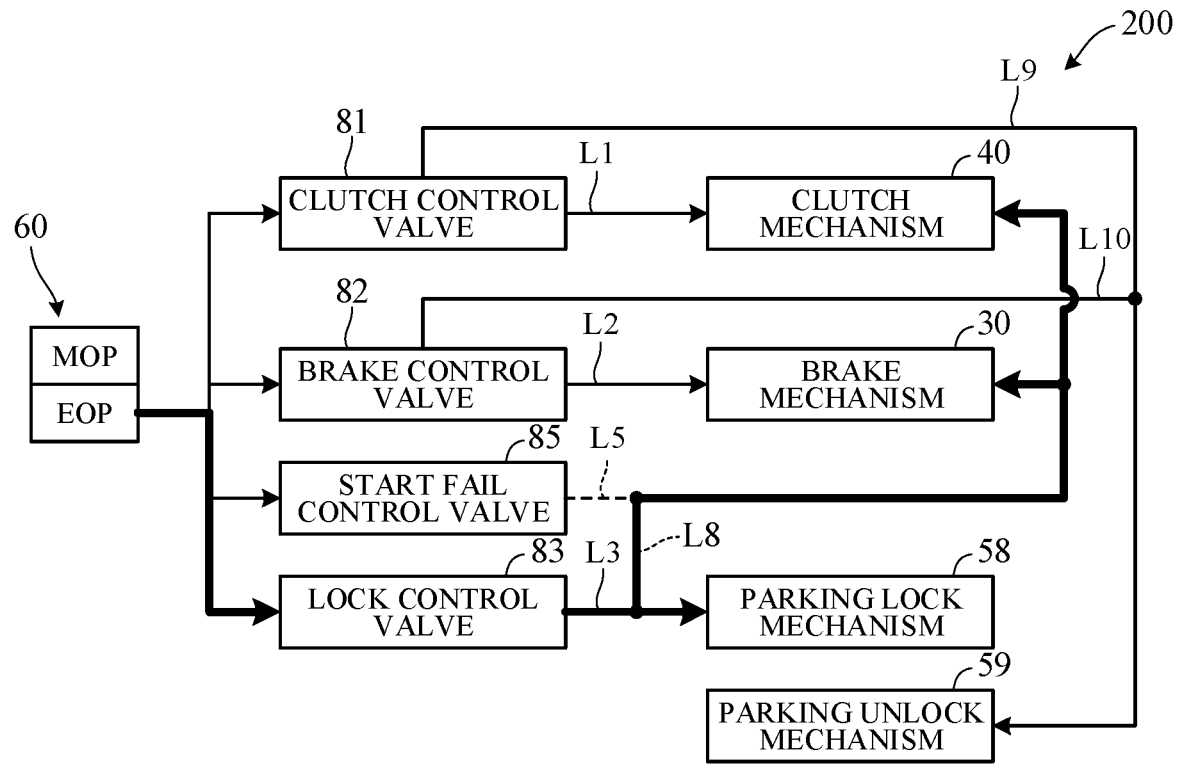
FIG. 13C is a diagram showing a flow of hydraulic oil in normal state of control valves in parking lock mode.
Figure 13D:
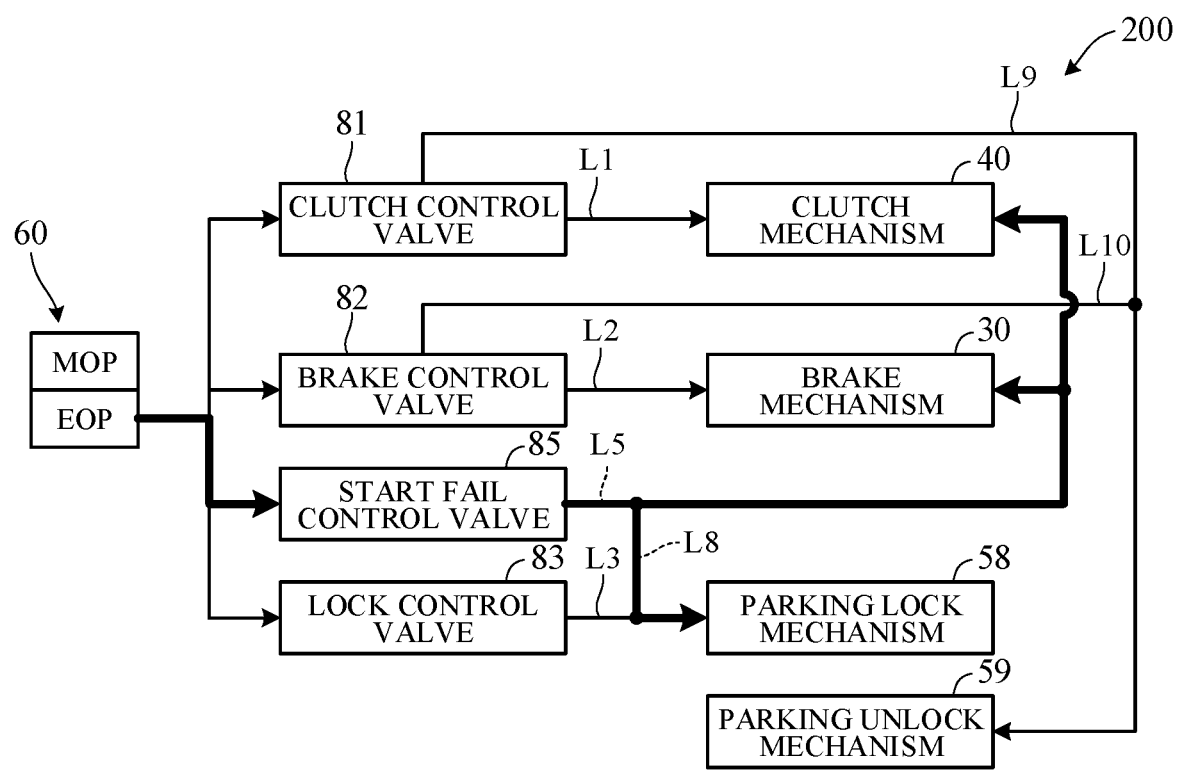
FIG. 13D is a diagram showing a flow of hydraulic oil in failed state of control valves in parking lock mode.
Figure 13E:
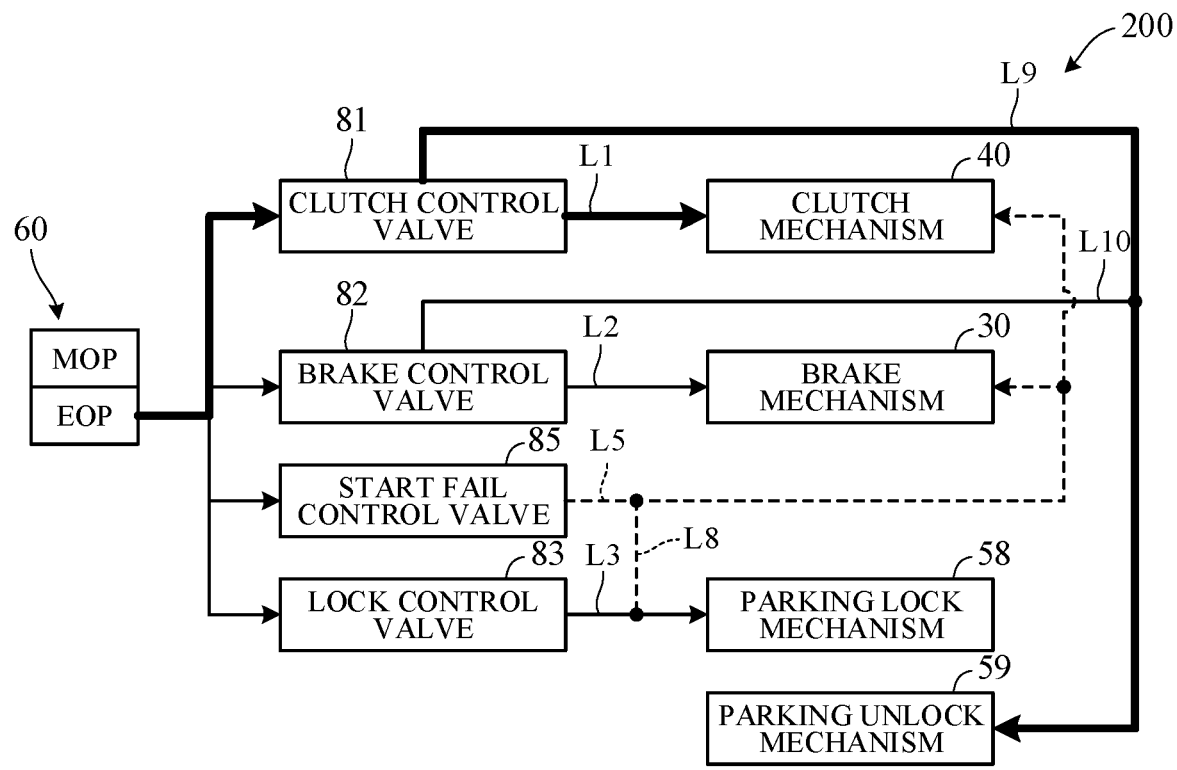
FIG. 13E is a diagram showing a flow of hydraulic oil in normal state of control valves in parking unlock mode.
Figure 13F:
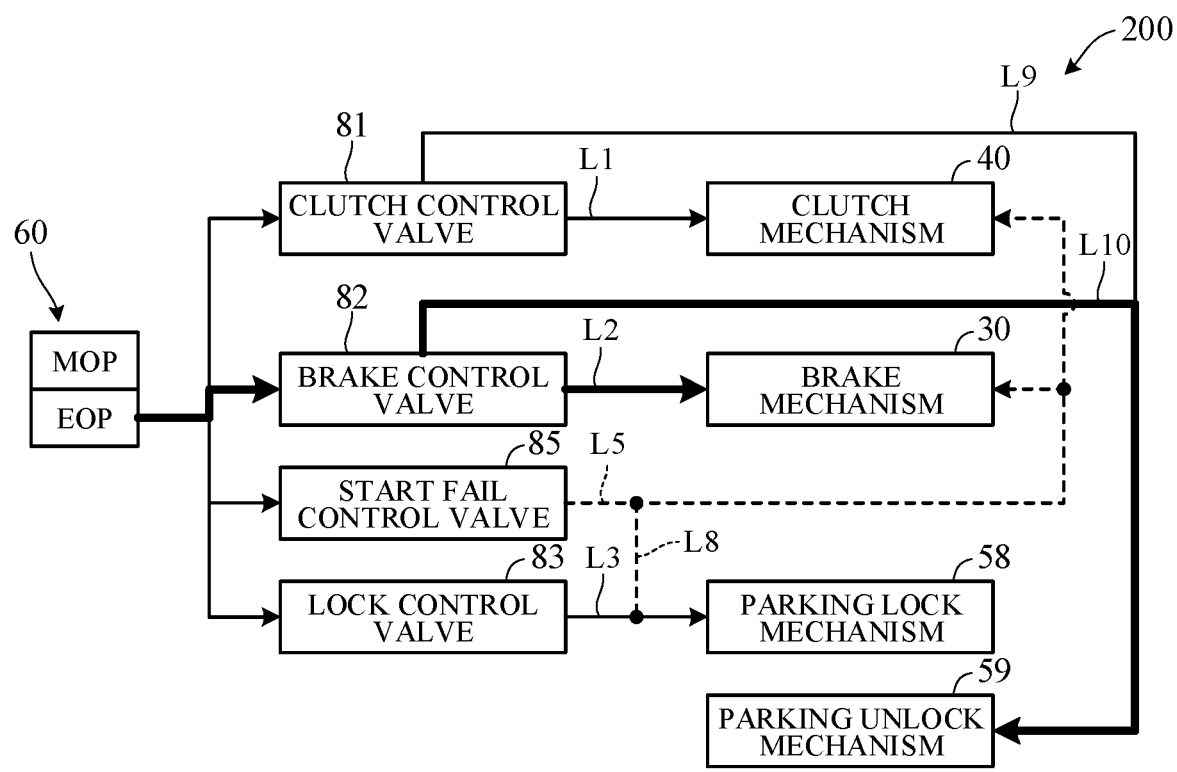
FIG. 13F is a diagram showing a flow of hydraulic oil in failed state of control valves in parking unlock mode.

Therefore, as indicated by thick lines in FIG. 13B, hydraulic oil from the hydraulic pressure source 60 is supplied through the start fail control valve 85 and oil passage L5 to the clutch mechanism 40 and brake mechanism 30, thereby enabling start of the engine 1. Concomitantly, hydraulic oil passing through the start fail control valve 85 is supplied through oil passage L8 to the parking lock mechanism 58 to actuate parking lock, i.e., operate the parking brake. Therefore, even when one or the other of the clutch mechanism 40 and brake mechanism 30 fails, the first motor-generator 2 can be powered by the engine 1 to generate electricity and thoroughly charge the battery 6.

If when the vehicle is stopped, should the controller 4 determine need to actuate parking lock owing to, for example, detection of a parking lock operation by the driver, the controller 4 outputs a control signal to the lock control valve 83 to turn the lock control valve 83 ON (FIG. 12). Therefore, as indicated by a thick line in FIG. 13C, hydraulic oil is supplied through oil passage L3 to the parking lock mechanism 58, thereby actuating parking lock. At this time, hydraulic oil from the lock control valve 83 is supplied through oil passage L8 to the clutch mechanism 40 and brake mechanism 30, thereby engaging the clutch mechanism 40 and brake mechanism 30.

On the other hand, if when the controller 4 determines need to actuate parking lock, i.e., operate the parking brake, should the controller 4 also determine based on signal(s) from the hydraulic pressure sensor(s) 38 that the lock control valve 83 fails, the controller 4 outputs a control signal to the start fail control valve 85 to turn the start fail control valve 85 ON (FIG. 12). Therefore, as indicated by thick lines in FIG. 13D, hydraulic oil from the hydraulic pressure source 60 is supplied through the start fail control valve 85 and oil passage L5 to the clutch mechanism 40 and brake mechanism 30 and through oil passage L8 to the parking lock mechanism 58. As a result, the clutch mechanism 40 and brake mechanism 30 engage, and parking lock can be actuated. Parking lock can therefore be actuated when the lock control valve 83 fails, without need to provide a dedicated control valve for dealing with failure of lock control valve 83 (such as the lock fail control valve 86 of FIG. 10).

If when in locked state of the parking brake, should parking unlock operation by the driver be detected and the controller 4 determine that parking unlock is needed, the controller 4 outputs a control signal to the clutch control valve 81 to turn the clutch control valve 81 ON (FIG. 12). Therefore, as indicated by a thick line in FIG. 13E, hydraulic oil from the clutch control valve 81 is supplied through oil passage L9 to the parking unlock mechanism 59, thereby actuating parking unlock. Parking unlock can therefore be actuated to enable vehicle traveling without need to provide a dedicated control valve for parking unlock (such as the unlock control valve 84 of FIG. 10). Alternatively, when the controller 4 determines that parking unlock is needed, it is possible instead of turning the clutch control valve 81 ON to turn the brake control valve 82 ON, thereby actuating parking unlock by supplying hydraulic oil from the brake control valve 82 through oil passage L10 to the parking unlock mechanism 59.

Moreover, if when the controller 4 determines need to actuate parking unlock, should the controller 4 also determine based on signal(s) from the hydraulic pressure sensor(s) 38 that the clutch control valve 81 fails, the controller 4 outputs a control signal to the brake control valve 82 to turn the brake control valve 82 ON, as shown in FIG. 12. Therefore, as indicated by a thick line in FIG. 13F, hydraulic oil from the brake control valve 82 is supplied through oil passage L10 to the parking unlock mechanism 59, thereby actuating parking unlock. Parking unlock can therefore be actuated to enable vehicle traveling even when the clutch control valve 81 used to actuate parking unlock fails.

The present embodiment can achieve advantages and effects such as the following:

(1) The drive apparatus 100 of the hybrid vehicle includes: the engine 1; the mutually series-connected first power transmission path 71 and second power transmission path 72; the first motor-generator 2 connected to the output shaft 1a of the engine 1; the first planetary gear mechanism 10 for dividing and outputting power generated by the engine 1 to between the first motor-generator 2 and the first power transmission path 71; the second motor-generator 3 connected to the second power transmission path 72; and the speed change mechanism 70, the hydraulic pressure control unit 8 (hydraulic circuit 200) and the controller 4, which switches to a drive mode among multiple drive modes including EV mode for traveling by power of the second electric motor 3 with drive by the engine stopped, start mode for starting the engine 1, and HV mode for traveling by power of the engine 1 and power of the second motor-generator 3; (FIG. 1). The speed change mechanism 70 includes: the second planetary gear mechanism 20 having the second sun gear 21, the second ring gear 22 and the second carrier 24 and installed in the first power transmission path 71; the multiple hydraulically driven actuators including, inter alia, the clutch mechanism 40, the brake mechanism 30 and the parking lock mechanism 58; the multiple control valves for controlling flow of hydraulic oil from the hydraulic pressure source 60 to the multiple hydraulic actuators, including, inter alia, the clutch control valve 81, the brake control valve 82 and the start fail control valve 85; and the hydraulic pressure sensors 38 for detecting failure of the multiple control valves; and the controller 4 controls the multiple control valves in accordance with a switching instruction of drive mode (FIGS. 1 and 9). The clutch mechanism 40 is adapted to couple and uncouple the second ring gear 22 and the second sun gear 21, and the brake mechanism 30 is adapted to brake and unbrake rotation of the second ring gear 22. The multiple control valves include the clutch control valve 81 interposed in oil passage L1 communicating the hydraulic pressure source 60 and the clutch mechanism 40, the brake control valve 82 interposed in oil passage L2 communicating the hydraulic pressure source 60 and the brake mechanism 30, the lock control valve 83 interposed in oil passage L3 communicating the hydraulic pressure source 60 and the parking lock mechanism 58, and the start fail control valve 85 interposed in oil passage L5 communicating the hydraulic pressure source 60 with the clutch mechanism 40, brake mechanism 30 and parking lock mechanism 58 (FIG. 9), When activating parking lock under condition of detected failure of the lock control valve 83 by associated hydraulic pressure sensor 38, the controller 4 controls the start fail control valve 85 to supply hydraulic oil to the clutch mechanism 40, brake mechanism 30 and parking lock mechanism 58 (FIG. 12).

Thus, in the present embodiment, the start fail control valve 85 is interposed in oil passage L5 communicating the hydraulic pressure source 60 with the clutch mechanism 40, brake mechanism 30 and parking lock mechanism 58, and when parking lock is to be activated under condition of detected failure of the lock control valve 83, the controller 4 controls the start fail control valve 85 to supply hydraulic oil to the clutch mechanism 40, brake mechanism 30 and parking lock mechanism 58. Parking lock can therefore be reliably actuated when the lock control valve 83 fails, without need to provide a dedicated control valve for dealing with failure of lock control valve 83 (lock fail control valve 86 of FIG. 10). Since this decreases the number of control valves used in the drive apparatus 100, cost increase can be minimized. Hydraulic oil is also supplied through the start fail control valve 85 to the clutch mechanism 40 and brake mechanism 30. Therefore, the engine 1 can be started to generate electricity by the first motor-generator 2 concurrently with actuating parking lock.

(2) The multiple hydraulic actuators of the drive apparatus 100 further include the parking unlock mechanism 59 for actuating parking unlock, i.e., canceling operation of the parking brake (FIG. 9). The hydraulic circuit 200 is adapted to supply hydraulic oil flowing through the clutch control valve 81 to the clutch mechanism 40 and the parking unlock mechanism 59 and to supply hydraulic oil passing through the brake control valve 82 to the brake mechanism 30 and the parking unlock mechanism 59 (FIG. 9). Since hydraulic oil passing through the clutch control valve 81 and hydraulic oil passing through the brake control valve 82 are therefore supplied to the parking unlock mechanism 59, control valves associated with the parking unlock mechanism 59 (unlock control valve 84 and unlock fail control valve 87 of FIG. 10) become unnecessary, thereby enabling still further reduction of number of control valves used in the drive apparatus 100. Moreover, in the present embodiment, once the vehicle starts to travel in EV mode after the clutch mechanism 40 or brake mechanism 30 engages and parking lock is released (FIG. 3), rotational speeds of the engine 1 and first motor-generator 2 are maintained at 0. Since loss owing to co-rotation or the like of the engine 1 can therefore kept down, parking unlock can be efficiently achieved.

(3) The drive apparatus 100 further includes the one-way clutch 50 installed between the output shaft 27 of the first power transmission path 71 and the input shaft (rotating shaft 3a) of the second power transmission path 72 to allow relative rotation of the rotating shaft 3a with respect to the output shaft 27 in one direction and prohibit relative rotation thereof in opposite direction (FIG. 1). During traveling in EV mode, therefore, the engine 1 can start efficiently with no occurrence of pull back of torque even if the clutch mechanism 40 and brake mechanism 30 engage simultaneously.

Various modifications of the aforesaid embodiment are possible. Some examples are explained in the following. In the aforesaid embodiment, a plurality of hydraulic actuators include the clutch mechanism 40 as a first hydraulic actuator, the brake mechanism 30 as a second hydraulic actuator, the parking lock mechanism 58 as a third hydraulic actuator, and the parking unlock mechanism 59 as a fourth hydraulic actuator. However, a plurality of hydraulic actuators may include other actuator.

In the aforesaid embodiment, the second carrier 24, the second sun gear 21 and the second ring gear 22 of the second planetary gear mechanism 20 are respectively used as a first rotation member to which power divided by the first planetary gear mechanism 10 (a power division mechanism) is input, as a second rotation member connected to the second power transmission path 72 and as a third rotation member. However, each of the first, second and third rotation members may be any one of the sun gear, the ring gear and the carrier, a combination of the first, second and third rotation members is not limited to the aforesaid configuration. In other words, the second and third rotation members coupled or uncoupled by the clutch mechanism 40 (a clutch actuator) and the third rotation member braked or non-braked by the brake mechanism (a brake actuator) are not limited to the aforesaid configuration.

In the aforesaid embodiment, the clutch control valve 81 (a first control valve) is disposed in oil passage L1 (a first oil passage) connecting the hydraulic pressure source 60 and the clutch mechanism 40 (a first hydraulic actuator), the brake control valve 82 (a second control valve) is disposed in oil passage L2 (a second oil passage) connecting the hydraulic pressure source 60 and the brake mechanism 30 (a second hydraulic actuator), the lock control valve 83 (a third control valve) is disposed in oil passage L3 (a third oil passage) connecting the hydraulic pressure source 60 and the parking lock mechanism 58 (a third hydraulic actuator), and the start fail control valve 85 (a fourth control valve) is disposed in oil passage L5 (a fourth oil passage) connecting the hydraulic pressure source 60 and each of the clutch mechanism 40, the brake mechanism 30 and the parking lock mechanism 58. Further, the clutch control valve 81 and the parking unlock mechanism 59, or oil passage L1 and the parking unlock mechanism 59 are connected through oil passage L9 (a fifth oil passage), and the brake control valve 82 and the parking unlock mechanism 59, or oil passage L2 and the parking unlock mechanism 59 are connected through oil passage L10 (sixth oil passage) (FIG. 9 and FIG. 11). However, the configuration of a hydraulic circuit in the hydraulic pressure control unit 8 is not limited to the aforesaid configuration. In the aforesaid embodiment, failure of the control valves 81 to 83 and 85 is detected by the hydraulic pressure sensor 38. However, the failure may be detected by a displacement sensor for detecting a displacement of a spool of the control valve. Therefore, the configuration of a failure detecting part is not limited to the aforesaid configuration.

Although in the aforesaid embodiment, a mode switching unit configured by the speed change mechanism 70 and controller 4, etc., switches drive mode to any one of a plurality of drive modes such as EV mode, HV mode and start mode, the mode switching unit may switch to other drive mode. The plurality of drive modes include a parking lock mode in which the parking brake is operated, and a parking unlock mode in which the operation of the parking brake is canceled. Although in the aforesaid embodiment, the controller 4 controls a plurality of control valves 81 to 83 and 85 in accordance with a switching instruction of drive mode, an electronic control unit is not limited to the aforesaid configuration. In other words, as long as controlling the start fail control valve so as to supply hydraulic oil to the clutch mechanism 40, brake mechanism 30 and parking lock mechanism 58 when operating the parking brake in a state that failure of the lock control valve 83 is detected, the controller 4 is not limited to the aforesaid configuration.

In the aforesaid embodiment, when the parking brake is switched to locked state, the controller 4 instructs to engage the clutch mechanism 40 and the brake mechanism 30 at the same time (FIG. 12). Alternatively, the hydraulic circuit may be configured so that the parking brake operates by engaging the clutch mechanism 40 and disengaging the brake mechanism 30 or by disengaging the clutch mechanism 40 and engaging the brake mechanism 30. Although in the aforesaid embodiment, one of the clutch mechanism 40 and brake mechanism 30 is engaged to switch the parking brake to unlocked state (FIG. 12), the clutch mechanism 40 and brake mechanism 30 may be engaged at the same time to switch the parking brake to unlocked state. Although multi-plate wet type engagement elements are used in the brake mechanism 30 and clutch mechanism 40, band brake, dog or other mechanism operating by hydraulic pressure can be used instead. Similarly, various kinds of mechanisms operating by hydraulic pressure can be used to the parking lock mechanism 58 and parking unlock mechanism 59. Although in the aforesaid embodiment, the one-way clutch 50 is interposed between the output shaft 27 of the first power transmission path 71 and the input shaft (rotating shaft 3a) of the second power transmission path 72, position of the one-way clutch is not limited to the aforesaid configuration.

The aforesaid embodiment can be combined as desired with one or more of the above modifications. The modifications can also be combined with one another.

According to the present invention, it is possible to efficiently decrease the number of control valves used to a hybrid vehicle drive apparatus.

Above, while the present invention has been described with reference to the preferred embodiments thereof, it will be understood, by those skilled in the art, that various changes and modifications may be made thereto without departing from the scope of the appended claims.

What is claimed is:
1. A drive apparatus of a hybrid vehicle, comprising:
an internal combustion engine;
a first power transmission path and a second power transmission path connected with each other in series;
a first motor-generator connected to an output shaft of the internal combustion engine;
a power division mechanism configured to divide and output a power generated by the internal combustion engine to the first motor-generator and the first power transmission path;
a second motor-generator connected to the second power transmission path; and
a mode switching unit configured to switch a drive mode to one of a plurality of drive modes including an EV mode in which the hybrid vehicle is driven by a power of the second motor-generator with the internal combustion engine stopped, a start mode in which the internal combustion engine is started, and a HV mode in which the hybrid vehicle is driven by the power of the internal combustion engine and the power of the second motor-generator, wherein
the mode switching unit includes:
 a planetary gear mechanism disposed in the first power transmission path and including a sun gear, ring gear and a carrier;
 a hydraulic pressure source;
 a plurality of hydraulic actuators including a first hydraulic actuator, a second hydraulic actuator and a third hydraulic actuator, respectively operated by a hydraulic pressure of a hydraulic oil supplied from the hydraulic pressure source;
 a plurality of control valves configured to control flows of the hydraulic oil from the hydraulic pressure source to the plurality of hydraulic actuators;
 a failure detecting part configured to detect a failure of the plurality of control valves; and
 an electronic control unit including a microprocessor configured to perform controlling the plurality of control valves in accordance with a switching instruction of the drive mode,
each of the sun gear, the ring gear and the carrier is any one of a first rotation member to which a power divided by the power division mechanism is input, a second rotation member connected to the second power transmission path, and a third rotation member,
the first hydraulic actuator is a clutch actuator configured to couple or uncouple the second rotation member and the third rotation member,
the second hydraulic actuator is a brake actuator configured to brake or non-brake the third rotation member,
the third hydraulic actuator is a parking lock actuator configured to operate a parking brake of the hybrid vehicle,
the plurality of control valves includes:
 a first control valve disposed in a first oil passage connecting the hydraulic pressure source and the first hydraulic actuator;
 a second control valve disposed in a second oil passage connecting the hydraulic pressure source and the second hydraulic actuator;
 a third control valve disposed in a third oil passage connecting the hydraulic pressure source and the third hydraulic actuator; and
 a fourth control valve disposed in a fourth oil passage connecting the hydraulic pressure source and each of the first hydraulic actuator, the second hydraulic actuator and the third hydraulic actuator, and
the microprocessor is configured to perform
the controlling including controlling the fourth control valve so that the hydraulic oil is supplied to the first hydraulic actuator, the second hydraulic actuator and the third hydraulic actuator, respectively, when the parking brake is operated in a state that the failure of the third control valve is detected by the failure detecting part.

2. The drive apparatus according to claim 1, wherein
the plurality of hydraulic actuators further includes a fourth hydraulic actuator configured to cancel an operation of the parking brake, and
the mode switching unit further includes a hydraulic circuit configured so that the hydraulic oil flowing through the first control valve is supplied to the first hydraulic actuator and the fourth hydraulic actuator and the hydraulic oil flowing through the second control valve is supplied to the second hydraulic actuator and the fourth hydraulic actuator.

3. The drive apparatus according to claim 2, wherein the hydraulic circuit includes:
a fifth oil passage connecting the first oil passage and the fourth hydraulic actuator;
a sixth oil passage connecting the second oil passage and the fourth hydraulic actuator;
a first check valve disposed in the fifth oil passage to prevent the hydraulic oil from flowing from the fifth oil passage to the first oil passage; and
a second check valve disposed in the sixth oil passage to prevent the hydraulic oil from the sixth oil passage to the second oil passage.

4. The drive apparatus according to claim 2, wherein the hydraulic circuit includes:
a fifth oil passage connecting the first control valve and the fourth hydraulic actuator; and
a sixth oil passage connecting the second control valve and the fourth hydraulic actuator,
the first control valve is configured to cut off a connection of the first hydraulic actuator and the fourth hydraulic actuator through the fifth oil passage when cutting off a connection of the hydraulic pressure source and the first hydraulic actuator through the first oil passage, and
the second control valve is configured to cut off a connection of the second hydraulic actuator and the fourth hydraulic actuator through the sixth oil passage when cutting off a connection of the hydraulic pressure source and the second hydraulic actuator through the second oil passage.

5. The drive apparatus according to claim 1, further comprising
a one-way clutch interposed between an output shaft through which a torque is output from the first power transmission path and an input shaft through which the torque is input to the second power transmission path to allow a rotation of the input shaft relative to the output shaft in a first direction and prevent the rotation of the input shaft relative to the output shaft in a second direction opposite to the first direction.

6. The drive apparatus according to claim 1, wherein the first rotation member is the carrier, the second rotation member is the sun gear, and the third rotation member is the ring gear.

7. A drive method of a hybrid vehicle, the hybrid vehicle including: an internal combustion engine; a first power transmission path and a second power transmission path connected with each other in series; a first motor-generator connected to an output shaft of the internal combustion engine; a power division mechanism configured to divide and output a power generated by the internal combustion engine to the first motor-generator and the first power transmission path; a second motor-generator connected to the second power transmission path; and a planetary gear mechanism disposed in the first power transmission path and including a sun gear, ring gear and a carrier; a hydraulic pressure source; a plurality of hydraulic actuators including a first hydraulic actuator, a second hydraulic actuator and a third hydraulic actuator, respectively operated by a hydraulic pressure of a hydraulic oil supplied from the hydraulic pressure source; a plurality of control valves configured to control flows of the hydraulic oil from the hydraulic pressure source to the plurality of hydraulic actuators; and a failure detecting part configured to detect a failure of the plurality of control valves, the drive method comprising:
switching a drive mode to one of a plurality of drive modes including an EV mode in which the hybrid vehicle is driven by a power of the second motor-generator with the internal combustion engine stopped, a start mode in which the internal combustion engine is started, and a HV mode in which the hybrid vehicle is driven by the power of the internal combustion engine and the power of the second motor-generator;
detecting a failure of the plurality of control valves; and
controlling the plurality of control valves in accordance with a switching instruction of the drive mode, wherein
each of the sun gear, the ring gear and the carrier is any one of a first rotation member to which a power divided by the power division mechanism is input, a second rotation member connected to the second power transmission path, and a third rotation member,
the first hydraulic actuator is a clutch actuator configured to couple or uncouple the second rotation member and the third rotation member,
the second hydraulic actuator is a brake actuator configured to brake or non-brake the third rotation member,
the third hydraulic actuator is a parking lock actuator configured to operate a parking brake of the hybrid vehicle,
the plurality of control valves includes: a first control valve disposed in a first oil passage connecting the hydraulic pressure source and the first hydraulic actuator; a second control valve disposed in a second oil passage connecting the hydraulic pressure source and the second hydraulic actuator; a third control valve disposed in a third oil passage connecting the hydraulic pressure source and the third hydraulic actuator, and a fourth control valve disposed in a fourth oil passage connecting the hydraulic pressure source and each of the first hydraulic actuator, the second hydraulic actuator and the third hydraulic actuator, and
the controlling includes controlling the fourth control valve so that the hydraulic oil is supplied to the first hydraulic actuator, the second hydraulic actuator and the third hydraulic actuator, respectively, when the parking brake is operated in a state that the failure of the third control valve is detected by the failure detecting part.

* * * * *